United States Patent
Gilron (10) Patent No.: US 8,632,682 B2
(45) Date of Patent: Jan. 21, 2014

(54) METHOD AND APPARATUS FOR REPOSITIONING FLOW ELEMENTS IN A TAPERED FLOW STRUCTURE

(75) Inventor: Jack L. Gilron, Beer-Sheva (IL)

(73) Assignee: Ben-Gurion University of the Negev Research and Development Authority, Beer-Sheva (IL)

(*) Notice: Subject to any disclaimer, the term of this patent is extended or adjusted under 35 U.S.C. 154(b) by 1152 days.

(21) Appl. No.: 11/922,701

(22) PCT Filed: Jun. 22, 2006

(86) PCT No.: PCT/IL2006/000728
§ 371 (c)(1), (2), (4) Date: Dec. 29, 2008

(87) PCT Pub. No.: WO2006/137068
PCT Pub. Date: Dec. 28, 2006

(65) Prior Publication Data
US 2009/0211973 A1    Aug. 27, 2009

Related U.S. Application Data

(60) Provisional application No. 60/692,963, filed on Jun. 23, 2005.

(51) Int. Cl.
*B01D 61/00* (2006.01)

(52) U.S. Cl.
USPC ............ 210/321.69; 210/321.6; 210/650; 210/652

(58) Field of Classification Search
None
See application file for complete search history.

(56) References Cited

U.S. PATENT DOCUMENTS 3,552,574 A * 1/1971 Lowe et al. .................. 210/353
4,080,289 A * 3/1978 Ebara et al. .................. 210/636

(Continued)

FOREIGN PATENT DOCUMENTS

| WO | 2005/030647 | 4/2005 |
| WO | 2005/040930 | 6/2005 |
| WO | 2005/053824 | 6/2005 |

OTHER PUBLICATIONS

International Search Report mailed Jan. 4, 2007.

(Continued)

*Primary Examiner* — Krishnan S Menon
(74) *Attorney, Agent, or Firm* — Nixon & Vanderhye P.C.

(57) ABSTRACT

A method for operating a tapered flow pressure driven arrangement containing a plurality of membrane modules, which comprises positioning said membrane modules in at least two successively arranged flow stages, such that the number of membrane modules operating in parallel in a given flow stage is greater than their number in the consecutive flow stage, passing a feed stream through a flow stage to generate a permeate and a concentrate, directing said concentrate to the consecutive flow stage and passing said concentrate therethrough, while periodically replacing one or more of the membrane modules belonging to said consecutive flow stage with one or more membrane modules belonging to the previous flow stage, wherein the periodicity of said replacement is such that the surface of membranes disposed in said consecutive flow stage is exposed to super-saturation conditions associated with the passage of said concentrate for a period of time that is shorter than the time required for said concentrate to precipitate therefrom one or more sparingly soluble salts and/or minerals, onto the surface of the membranes in said consecutive flow stage under said super-saturation conditions, or before deposit of organic substances can occur in the first of said two or more successively arranged flow stages. An apparatus for carrying out the aforementioned method is also provided.

4 Claims, 5 Drawing Sheets

(56) References Cited

U.S. PATENT DOCUMENTS

| | | | |
|---|---|---|---|
| 4,198,293 A | | 4/1980 | Ogawa et al. |
| 4,988,445 A | * | 1/1991 | Fulk, Jr. .................. 210/652 |
| 5,034,121 A | * | 7/1991 | Budin et al. .............. 210/108 |
| 5,071,552 A | * | 12/1991 | Bikson et al. ............ 210/321.8 |
| 6,113,797 A | * | 9/2000 | Al-Samadi ................. 210/652 |
| 6,423,230 B2 | | 7/2002 | Ilias et al. |
| 6,589,423 B1 | | 7/2003 | Chancellor |
| 2008/0230476 A1 | * | 9/2008 | Gilron et al. ............... 210/652 |

OTHER PUBLICATIONS

Supplementary European Search Report issued for European Application No. EP 06745167, dated Aug. 20, 2009.

* cited by examiner

METHOD AND APPARATUS FOR REPOSITIONING FLOW ELEMENTS IN A TAPERED FLOW STRUCTURE

This application is the U.S. national phase of International Application No. PCT/IL2006/000728, filed 22 Jun. 2006, which designated the U.S. and claims benefit to U.S. Provisional Application No. 60/692,963, filed 23 Jun. 2005, the entire contents of each of which are hereby incorporated by reference.

Figure 1:
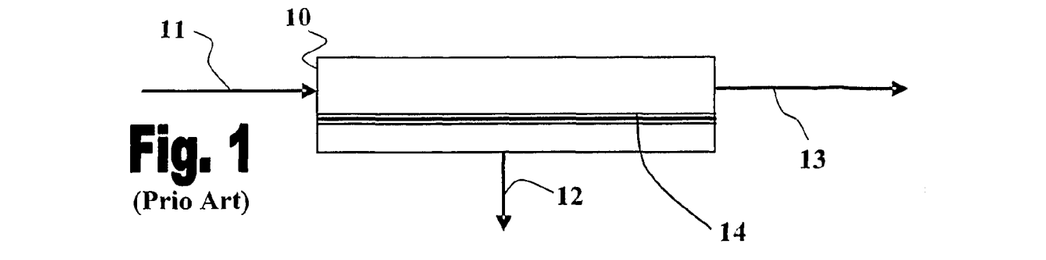
FIG. 1 schematically illustrates a conventional membrane module, as commonly used in filtration processes.

Many pressure driven operations, such as shown in FIG. 1A, are described by a process as cross-flow or tangential flow filtration in which a feed 11 directed into a membrane module 10 is passed in parallel to the surface of membrane 14 wherein it is split into two streams. The first stream 12 is the permeate which passes across a selective membrane barrier 14, and the remaining high pressure stream 13 which exits module 10 at the other end is the concentrate. A serial membrane module structure may contain two or more membrane modules connected in series wherein the concentrate of one module forms the feed flow of the next module downstream. As more and more of the fluid is passed through the membrane modules the flow rate of the concentrate 13 is gradually reduced.

If the flow rate is reduced below a certain level, then the buildup of rejected solutes and particulate matter on the membrane surface cannot be effectively removed by the tangential flow and shear forces of the fluid flowing largely parallel to the membrane surface. This buildup can lead to fouling of the membrane. For example most manufacturers of spiral wound membrane elements required a certain minimum flow rate in order to guarantee proper operation of their membrane elements. For example, most manufacturers of 8 inch diameter spiral wound membrane elements require a minimum of ~2.7 $m^3/hr$ as the exit concentrate flow rate.

If more than one spiral wound element is placed in series in a pressure vessel (i.e., membrane module), this minimum will apply to the exit flow from the last element in the pressure vessel. At the same time the manufacturers designate a maximum flow rate for the feed directed into any one membrane element so that shear forces should not mechanically disrupt the module. For example a typical maximum flow rate is 17 $m^3/h$ for an 8 inch diameter spiral wound element. If a high recovery rate (i.e., the percent of the feed stream recovered as permeate) is required, then if enough membrane modules are placed in parallel to prevent the maximum flow rate per membrane module from being exceeded, this can result in the concentration flow out of each module being below the minimal flow rate required.

Figure 2:
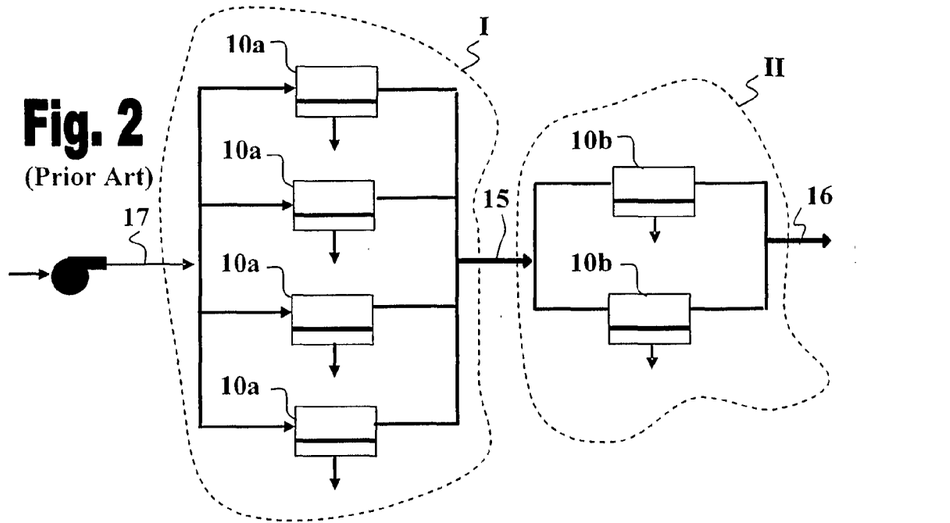
FIG. 2 schematically illustrates a typical tapered flow two-stage cascade structure.

A common method for resolving this dilemma is to design a tapered multistage system as shown in FIG. 1B. The tapered system shown in FIG. 1B (also referred to herein as tapered flow structure) consists of a first stage I having more modules 10a in parallel than in the second stage II, so that the concentrate 15 coming out of stage I is divided among a fewer number of modules 10b in stage II, such that the final concentrate 16 is such that the flow coming out of each of the second stage II modules 10b has a flow rate within the manufacturers' guidelines.

An interstage booster pump (not shown) can sometimes be used to raise the pressure of the first stage I concentrate 15 so that a more pressurized stream (15', not shown) is fed to the second stage II to overcome the higher average osmotic pressure in the second stage feed stream 15 and provide for a more equal distribution of the permeate flux (permeate flow rate per unit membrane area) between the membrane elements, 10a and 10b, of the two stages. A typical distribution of flows in a staged tapered flow system is shown in table 1.

TABLE 1

Description of flow streams in a typical tapered two stage cascade (four modules 10a in first stage I and two modules 10b in second stage II, wherein each module contains six 8 inch spiral wound membrane elements (14) in series).

| Stream | Feed (14) | Concentrate from stage I (15) | Concentrate from stage I using interstage pump (15') | Concentrate from stage II (16) |
|---|---|---|---|---|
| Total Flowrate, $m^3/h$ | 38.8 | 16.4 | 16.4 | 7.8 |
| Flowrate/$1^{st}$ stage mod. | 9.7 | 4.1 | | |
| Flowrate/$2^{nd}$ stage mod. | | | 8.2 | 3.9 |
| Pressure, bar | 6.7 | 5.3 | 9.3 | 8.3 |

The feed 17 in this example is a brackish water with 3350 mg/L TDS.

WO 2005/053824, the content of which is incorporated herein by reference, describes a method and system for preventing precipitation fouling in a pressure driven module by reversing the direction of the feed supplied to the membrane module. In order to prevent precipitation in the membrane module the direction of feed is reversed by alternately supplying the feed via feed line (11) and via the concentrate line (13), wherein the switching between said lines is made within time intervals smaller than the induction time ($\tau$).

Therefore there is a need for a system and a method for effectively preventing precipitation in a tapered flow structure.

It is therefore an object of the present invention to provide a method and system for alternating the direction of the feed passed in flow element (e.g., membrane modules) sets in a tapered flow structure.

It is another object of the present invention to provide a method and system for repositioning flow elements (e.g., membrane modules) in a tapered flow structure.

It is a further object of the present invention to provide a method and apparatus for preventing precipitating fouling in membrane modules in a tapered flow structure.

SUMMARY OF THE INVENTION

In a first aspect, the present invention provides a method for operating a tapered flow pressure driven arrangement containing a plurality of membrane modules, which comprises positioning said membrane modules in at least two successively arranged flow stages (which sequence of flow stages is conveniently designated $\{S_i\}$), such that the number of membrane modules operating in parallel in a given flow stage is greater than their number in the consecutive flow stage (the number of membrane modules operating in parallel within a particular stage $S_i$ is conveniently designated $N_i$), passing a feed stream through a flow stage to generate a permeate and a concentrate, directing said concentrate to the consecutive flow stage and passing said concentrate therethrough, while periodically replacing one or more of the membrane modules belonging to said consecutive flow stage with one or more membrane modules belonging to the previous flow stage, wherein the periodicity of said replacement is such that the surface of membranes disposed in said membrane modules is exposed to super-saturation conditions associated with the passage of said concentrate for a period of time that is shorter than the time required for said concentrate to precipitate therefrom one or more sparingly soluble salts and/or minerals onto the surface of the membranes in said consecutive flow stage under said super-saturation conditions, or before deposit of organic substances can occur in the first of said two or more successively arranged flow stages.

The term "flow stage", as used herein, relates to a group of membrane modules that are provided with a common feed stream and are connected in parallel thereto, wherein said membrane modules also discharge to a common concentrate stream.

Most preferably, essentially concurrently with the repositioning of membrane modules in the sequentially arranged flow stages, as described above, the flow direction within at least a portion of the newly positioned membrane modules is reversed. Specifically, when one or more membrane modules are removed from a flow stage $S_{i+1}$ and are repositioned in a flow stage $S_i$, then the feed stream supplied to flow stage $S_i$ will be passed through said newly positioned membrane modules in a direction which is opposite to the direction of the concentrate which was passed in said one or more membrane modules in flow stage $S_{i+1}$. Thus, the flow pattern provided by the present invention, which involves the relocation of membrane modules among successive flow stages, which relocation is preferably accompanied with a reversal of the flow direction in the newly located membrane modules, allows a membrane surface which was previously exposed to highly concentrated fluid (specifically, the region of the membrane surface which is located at the vicinity of the exit of flow stage $S_{i+1}$), to be contacted with a lesser concentrated fluid at flow stage $S_i$.

By the term "sparingly soluble salt or mineral" is generally meant a salt having a solubility product/dissociation constant less than $10^{-2}$ or solubility less than 300 mg/L for non-dissociating minerals. Particularly problematic sparingly soluble salts and/or minerals, the precipitation of which from the concentrate needs to be substantially prevented according to the present invention, are selected from the group consisting of calcium carbonate, calcium sulfate, silica, calcium phosphate, barium sulfate, strontium sulfate and calcium fluoride.

The term "organic substances", as used herein, collectively relates to organic and biological materials that may cause biofouling or organic fouling in pressure driven membrane processes.

Advantageously, the time during which the surface of membranes disposed in the consecutive flow stage is exposed to super-saturation conditions is less than the induction time $\tau$, which is the time required for the supersaturated stream to precipitate one or more of the sparingly soluble salts and/or minerals, as described in more detail below, wherein said induction time is predetermined experimentally, or estimated separately for each of said sparingly soluble salts and/or minerals present in the water stream using the following equation:

$$\ln(\tau) = \frac{A}{[\ln(S)]^2} + B$$

wherein:
A and B are constants related to a given sparingly soluble salt or mineral and the membrane used;
and S is the ratio between the maximum actual activity product of a given sparingly soluble salt or mineral in the solution next to the high pressure side of the membrane and the thermodynamic solubility product.

In the case of organic substances, the induction time here denotes the time for a significant deposit thereof to form, and more specifically, a deposit composed of a compacted layer of organic material or a biofilm with microorganisms embedded in extracellular polymeric substances with a thickness greater than 2-3 microns or covering more than 10% of the surface of a membrane sample being monitored.

The method provided by the present invention may be conveniently carried out by means of the following pressure-driven, tapered flow arrangement of membrane modules, which comprises:

Three or more assemblies of membrane modules, the total number of assemblies being designated as "n" (e.g., n may be in the range of 3 to 300), wherein each of said assemblies is provided with one or more membrane modules that are connected in parallel to a first port and to a second port of said assembly;

A source of pressurized stream;

An array of valves for delivering fluid streams into and from said assemblies and for determining, for each of said assemblies, whether the first and second port thereof is an entrance port or an exit port, respectively, or vice versa.

Typically, each membrane module (sometimes denoted in the art as pressure housing) contains one or more separation elements (e.g., between 1 and 8 when such elements are spiral wound separation elements).

Most suitably, means for collecting a permeate recovered by said tapered-flow pressure-driven arrangement and means for discharging the final concentrate rejected by said tapered-flow pressure-driven arrangement are also included in the arrangement described above.

In one preferred embodiment of the invention the array of valves comprises, for each membrane assembly, a three-way valve connected to the first port of said membrane assembly via a main port of said three-way valve, and wherein a second port of said three-way valve is connected to the source of pressurized stream, and wherein the third port of said three-way valve is connected to a main discharge line used for discharging the concentrate stream rejected by the assembly. Conveniently, the source of pressurized stream is connected to the second port of each of the three-way valves via a corresponding two-way valve.

Preferably, the array of valves comprises, for each membrane assembly, a three-way valve connected to the second port of each membrane assembly via a main port of said three-way valve, wherein the second and third ports of said three-way valves are in fluid communication with an internal concentrate discharge line. Advantageously, the third ports of each of the three-way valves, which are connected to the second port of the membrane assembly, are connected via a corresponding two-way valve to the internal concentrate discharge line.

Additionally or alternatively, the array of valves may comprise a two way valve which first port is connected to the internal concentrate discharge line, and whose second port is connected to the main discharge line.

The tapered flow arrangement may further comprise a pump having an inlet connected to the internal concentrate discharge line, and an outlet connected to the third ports of said three-way valves, via the two-way valves which may be connected therebetween.

The tapered flow arrangement may be operated using a controller or timer configured to provide the two-way and three-way valves suitable control signals to arranging a parallel connection between groups of membrane module assemblies, and a serial connection between said groups in a tapered structure, wherein said controller or timer is configured to provide said valves control signals for periodically repositioning membrane modules assemblies in said tapered structure.

The repositioning of membrane modules is advantageously affected within time intervals smaller than the time required for pressurized stream near the concentrate end of the membrane module array to precipitate therefrom one or more sparingly soluble salts and/or minerals, and/or for the pressurized stream near the feed end of the membrane module array to deposit organic substances onto the surface of the membranes.

The pressure-driven, tapered flow arrangement described above forms another aspect of the present invention. Hereinafter, for the sake of simplicity, an assembly of membrane modules is referred to as a "block" and the various blocks are designated by capital letters (A, B, C . . . )

BRIEF DESCRIPTION OF THE DRAWINGS:

The present invention is illustrated by way of example in the accompanying drawings, in which similar references consistently indicate similar elements and in which.

DETAILED DESCRIPTION OF PREFERRED EMBODIMENTS

In general, the present invention provides a system and method for repositioning sets of flow modules (e.g., membrane modules) in a tapered flow structure. More particularly, the present invention provides means and methods for repositioning blocks of membrane modules in a tapered-flow pressure driven membrane process, such that blocks of membrane modules receiving the most concentrated process fluid can be periodically repositioned to the position of the least concentrated process fluid. Advantageously, the repositioning of membrane modules blocks is performed within time intervals smaller than the time required for the start of precipitation fouling (i.e., less than the induction time τ), and/or within time intervals smaller than the time required for serious biofouling or organic fouling caused due to deposition of organic substances. A detailed definition of the induction time and methods for estimating the same are given hereinbelow, after the description of the drawings.

According to one preferred embodiment of the invention a tapered flow system allowing repositioning of sets of membrane modules is implemented by using at least six three-way valves and six two-way valves operated with a timer or programmable logic controller (PLC), or some other type of automatic controller means. In another preferred embodiment of the invention an augmented tapered flow system is used, wherein one additional two-way valve is used as a bypass valve.

In general, the present invention proposes means and methods for rotating between (at least) three blocks of membrane modules which are repeatedly placed in first (i) and second (ii) stages such that the majority of the membrane modules are in stage (i) and the minority of the membrane modules in stage (ii). In this way the maximum and minimum limits on flow rates through each membrane module are not exceeded.

The flow direction is preferably reversed in sets of membrane modules by moving them from stage (ii) to stage (i). The means to implement these operating modes are obtained by using suitable valving, as depicted in FIGS. 3A-3C and 4A-4F. While in a preferred embodiment of the invention six three-way valves and six two-way valves are used, it is of course obvious that other valve arrangements may be used to effect the same repeated rotation of the sets of membrane modules.

The valves can be actuated by a timer, programmable logic controller (PLC) (not shown in FIGS. 3A-3C and 4A-4F), or by using suitable computerized means allowing an automatic procedure to control the timing and sequence of actuating each of the valves.

In a preferred embodiment of the invention the number of membrane modules in the first stage (i) is twice the number of membrane modules in the second stage (ii). A stage is represented by a set of membrane modules that are connected in parallel, such that they are supplied with a common feed stream and share a common discharge channel discharging a common concentrate stream. A block of membrane modules in the system of the present invention contains one or more membrane modules connected in parallel to a common concentrate exit port and a common entrance port supplying a pressurized feed stream.

The present invention applies to tapered flow structures in general, and specifically to pressure driven membrane processes involving tapered staged arrangement of membrane modules, including but not limited to, reverse osmosis, nanofiltration, ultrafiltration and microfiltration processes, and it is applicable to, but not limited to, membrane element geometries including spiral wound, hollow fiber, plate and frame, and tubular membrane elements.

Figure 3A:
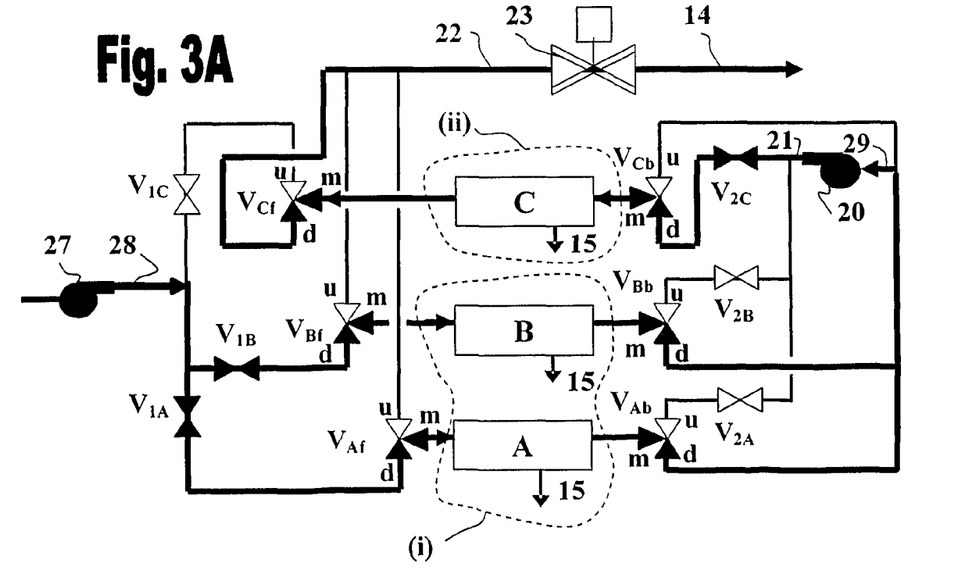
FIGS. 3A to 3C schematically illustrates a preferred embodiment of the invention for a tapered flow system, and a method of use thereof, in which the direction of the feed in blocks of membrane modules can be reversed.
Figure 3B:
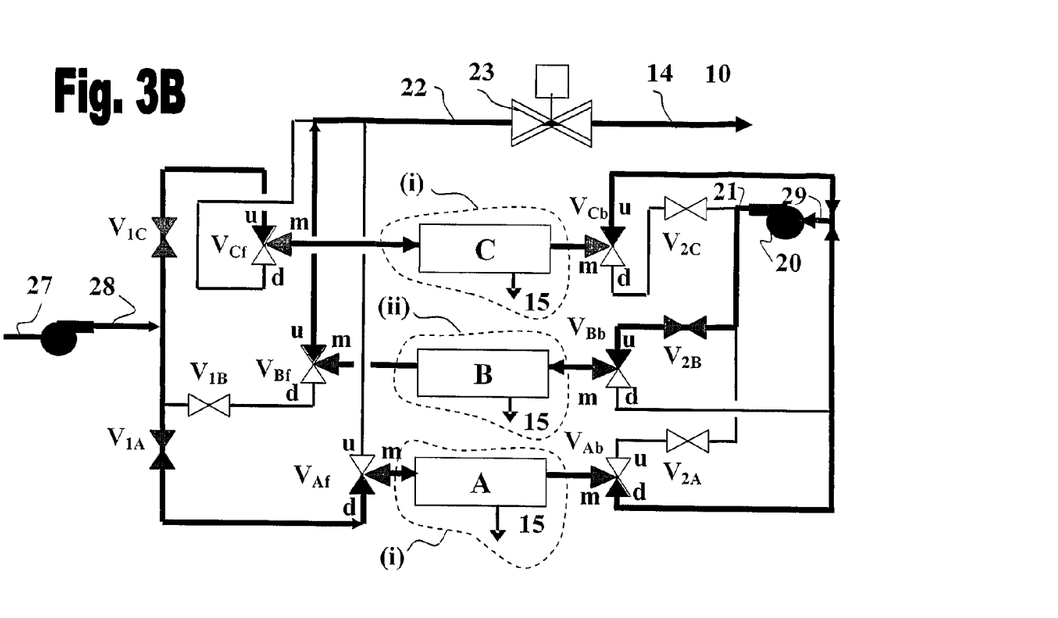
Figure 3C:
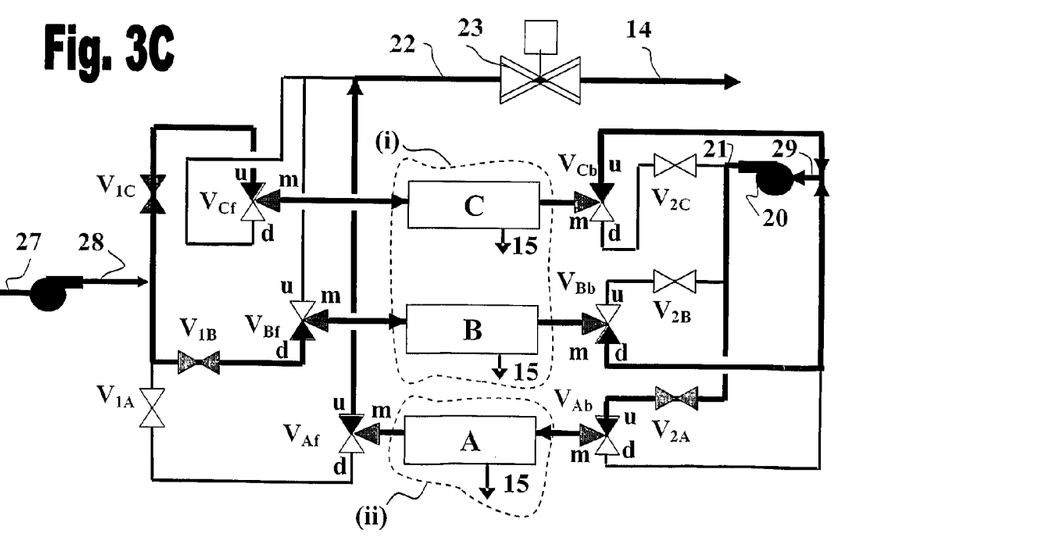
Figure 4A:
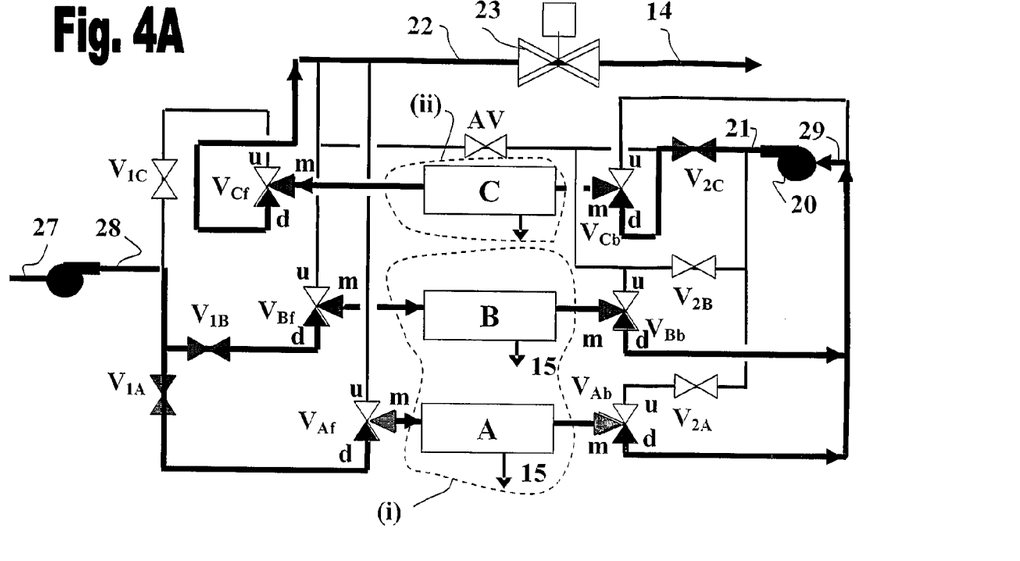
FIGS. 4A to 4F schematically illustrate another preferred embodiment of the invention for a tapered flow system, and a method of use thereof.
Figure 4B:
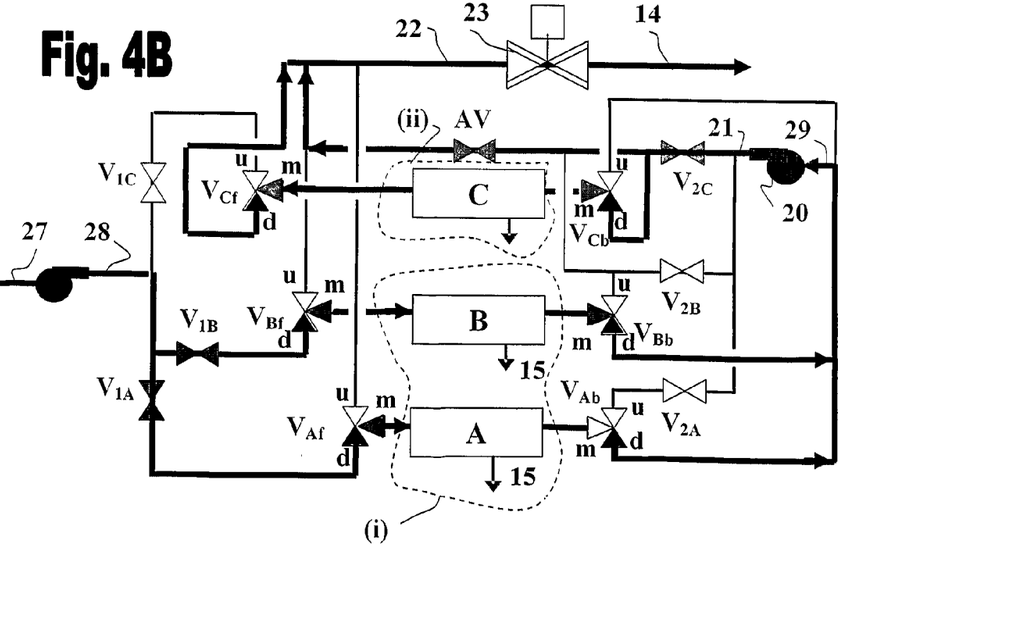
Figure 4C:
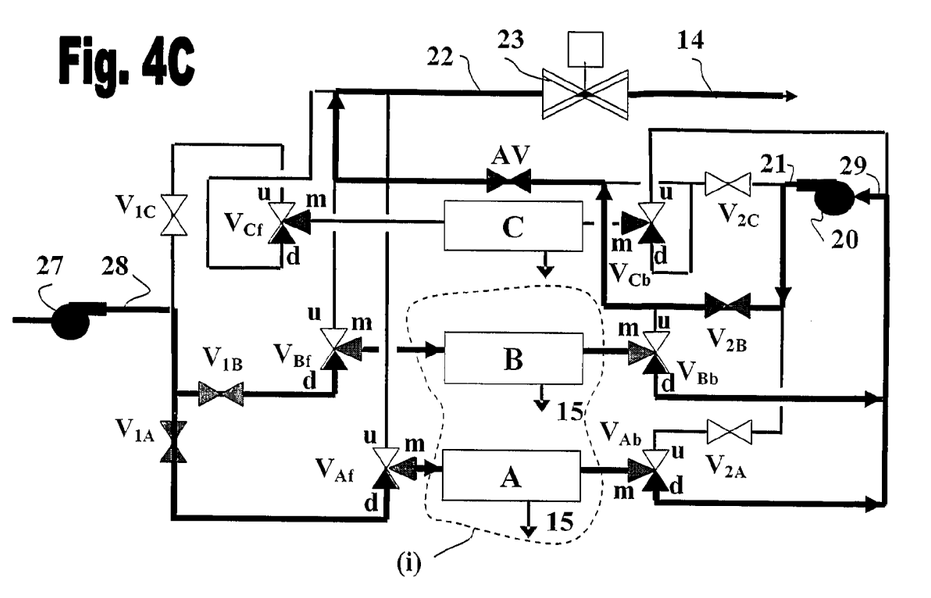
Figure 4D:
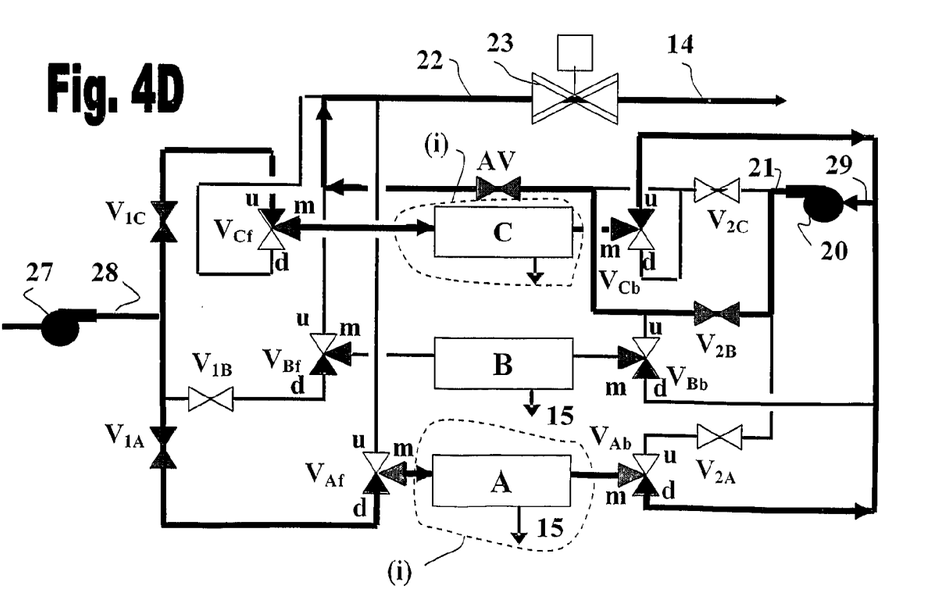
Figure 4E:
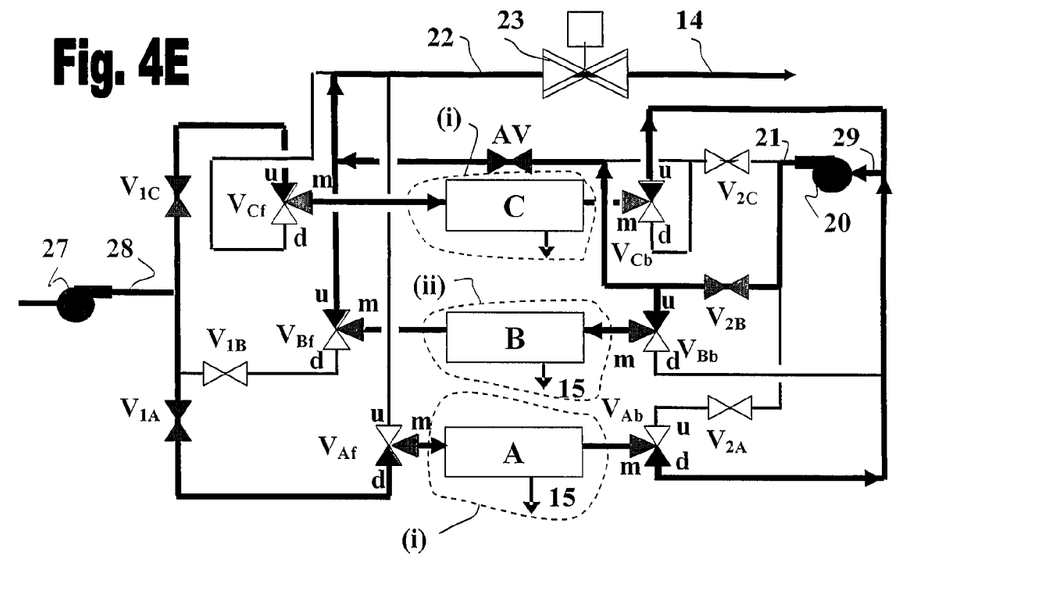
Figure 4F:
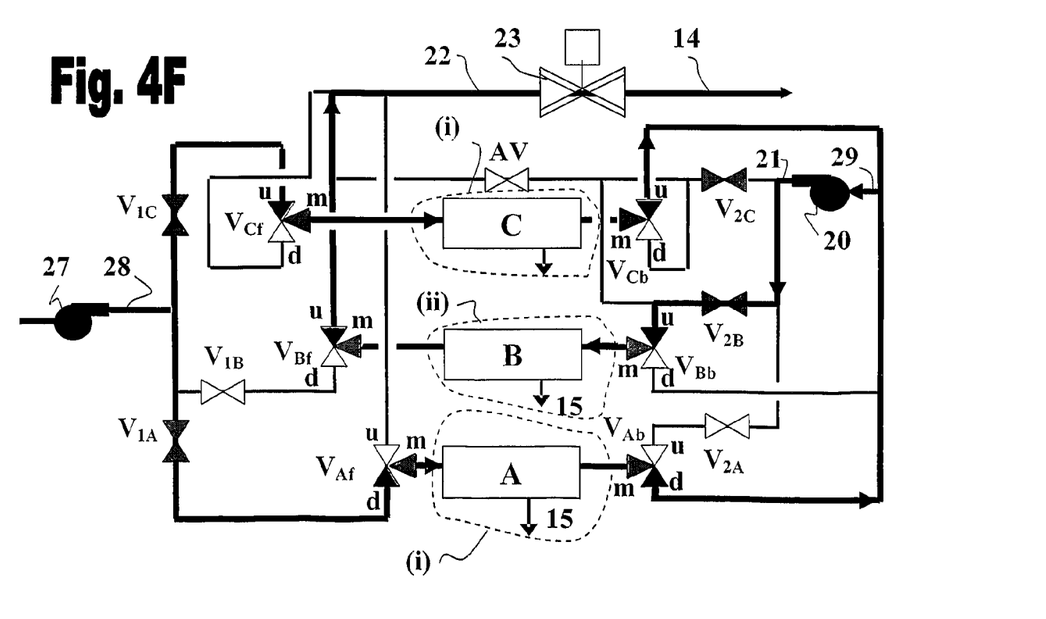

A preferred embodiment of the invention is shown in FIGS. 3A to 3C, wherein the membrane modules are arranged in three blocks, block A, block B and block C, each of which preferably comprise N/3 membrane modules connected in parallel. A three-way valve is connected at the front and back of each block, wherein said three-way valves are designated using the following convention—$V_{[Block\ A/B/C](Position\ front/back)}$. Accordingly, the three-way valves connected at the fronts of blocks A, B and C, are $V_{Af}$, $V_{Bf}$ and $V_{Cf}$, respectively, and the valves connected at the backs of blocks A, B and C, are $V_{Ab}$, $V_{Bb}$ and $V_{Cb}$. Each valve has a down (d) and up (u) position indicating whether the down or up branch of the three-way valve is communicating with its main (m) port. These are mutually exclusive, i.e. when the three-way valve is in the down (d) position the up branch (u) is closed and vice versa.

The membrane modules blocks are fed by a pressure pump 27 which supplies a feed stream 28 to stage (i). From stage (i) the stream 29 (also referred to herein as internal concentrate discharge line) is fed via a (optional) booster pump 20, which raises the pressure of stream 29, provided as stream 21 to stage (ii). From stage (ii), the concentrate stream exits via concentrate line 22 and passes any back pressure valves/flow restrictors 23, which generate the pressure of the concentrate stream 22 before the concentrate stream 14 exits the system. The permeate stream 15 is collected from each block and sent to collection. Three two-way valves $V_{1A}$, $V_{1B}$, and $V_{1C}$, are connected at the feed entrance point to stage (i), and three two-way valves $V_{2A}$, $V_{2B}$ and $V_{2C}$, are connected at the stream entrance point to stage (ii). A timer, PLC controller, or any other suitable control means (not shown), may be used to effect the sequential actuation of the various valves.

The block switching illustrated in FIGS. 3A to 3B is effected as depicted in table 2. In FIGS. 3A to 3C the active lines are shown in bold and the direction of flow with arrows. Valve ports that are open to flow are shown as filled and valve ports that are closed to flow are shown in white (unfilled). In table 2, $I_A$, $I_B$ and $I_C$, refer to the induction times appropriate for the concentrate stream composition 22 exiting blocks A, B or C respectively. Reverse flow means the high pressure feed stream enters the block port which served as the block exit port in the first step a) and exits from the block port which served as the block entrance port in the first step a).

tageously range between 0.6N to 0.8N, and the number of membrane modules in the third block range between 0.4N to 0.2N, respectively. Preferably, each block contains an equal number of modules (N/3). The membrane module blocks will be denoted hereinafter as block A, block B and block C. In any event, block A and block B include the same number of membrane modules in each block. Originally, block A and block B are arranged in parallel in stage (i) while block C is in stage (ii), as exemplified in FIG. 3A.

TABLE 1

Description of status of tapered three-block/two-stage cascade operated with periodic reverse flow to prevent scaling and fouling

| Step | Duration | Stage (i) | Stage (ii) | $V_{Af}$ | $V_{Ab}$ | $v_{Bf}$ | $V_{Bb}$ | $V_{Cf}$ | $V_{Cb}$ | $V_{1A}$ | $V_{1B}$ | $V_{1C}$ | $V_{2A}$ | $V_{2B}$ | $V_{2C}$ |
|---|---|---|---|---|---|---|---|---|---|---|---|---|---|---|---|
| a | $0 < t < \tau_C$ | A + B | C | down | down | down | down | down | down | on | on | off | off | off | on |
| b | $0 < t < \tau_B$ | A + C | B | down | down | up | up | up | up | on | off | on | off | on | off |
| c | $0 < t < \tau_A$ | B + C | A | up | up | down | down | up | up | off | on | on | on | off | off |

TABLE 2

Example of substeps using bypass valve (AV) for effecting rotation of blocks A-C between stage 1 and stage 2 of tapered three-block membrane process as described in table 2

| Sub-steps | Bypass (AV) | Blocks Stage (i) | In: Stage (ii) | $V_{Af}$ | $V_{Ab}$ | $V_{Bf}$ | $V_{Bb}$ | $V_{Cf}$ | $V_{Cb}$ | $V_{1A}$ | $V_{1B}$ | $V_{1C}$ | $V_{2A}$ | $V_{2B}$ | $V_{2C}$ | |
|---|---|---|---|---|---|---|---|---|---|---|---|---|---|---|---|---|
| i | closed | A + B | C | down | down | down | down | down | down | open | open | closed | closed | closed | open | Transit |
| ii | open | A + B | C | down | down | down | down | down | down | open | open | closed | closed | closed | open | from |
| iii | open | A + B | none | down | down | down | down | up | up | open | open | closed | closed | open | closed | step a) |
| iv | open | A + C | none | down | down | down | down | up | up | open | closed | open | closed | open | closed | to step |
| v | open | A + C | B | down | down | up | up | up | up | open | closed | open | closed | open | closed | b) from |
| vi | closed | A + C | B | down | down | up | up | up | up | open | closed | open | closed | open | closed | table 2 |
| i | closed | A + C | B | down | down | up | up | up | up | open | closed | open | closed | open | closed | Transit |
| ii | open | A + C | B | down | down | up | up | up | up | open | closed | open | closed | open | closed | from |
| iii | open | A + C | none | down | down | down | down | up | up | open | closed | open | closed | open | closed | step b) |
| iv | open | B + C | none | down | up | down | down | up | up | closed | open | open | closed | open | closed | to step |
| v | open | B + C | A | up | up | down | down | up | up | closed | open | open | open | open | closed | c) from |
| vi | closed | B + C | A | up | up | down | down | up | up | closed | open | open | open | closed | closed | table 2 |
| i | closed | B + C | A | up | up | down | down | up | up | closed | open | open | open | closed | closed | Transit |
| ii | open | B + C | A | up | up | down | down | up | up | closed | open | open | open | closed | open | from |
| iii | open | B + C | none | down | down | down | down | up | up | closed | open | open | closed | closed | open | step c) |
| iv | open | A + B | none | down | down | down | down | down | up | open | open | closed | closed | closed | open | to step |
| v | open | A + B | C | down | down | down | down | down | down | open | open | closed | closed | closed | open | a) from |
| vi | closed | A + B | C | down | down | down | down | down | down | open | open | closed | closed | closed | open | table 2 |

A cycle of three consecutive steps is carried out with each step described as follows:

a) Blocks A and B are in stage (i) and block C is in stage (ii) (FIG. 3A).
b) Blocks A and C are in stage (i) and block B is in stage (ii) (FIG. 3B). The flows in blocks B and C are in the reverse direction to that in step a).
c) Blocks B and C are in stage (i) and block A is in stage (ii) (FIG. 3C). The flows through blocks A and C are in the reverse direction to that in step a).

As will be appreciated by those skilled in the art, a similar repositioning of blocks of membrane modules may be effected using three stages by means of four or more blocks of membrane modules and rotating them between the first, second and third stages by a procedure and means similar to that described for two stages.

In general, the repositioning procedure according to the method of the present invention is obtained as follows:

a) The system is constructed from N membrane modules that are divided into three blocks of modules, wherein the number of membrane modules in the first two blocks advan- The pressurized feed entrance ports of the membrane modules in each of the blocks are combined into an entrance manifold for that block having a common entrance port. Thus, in step a) the pressurized feed 28 is supplied to the entrance ports of the membrane modules connected in parallel in blocks A and B, while the membrane modules connected in parallel in block C receive the concentrate received from blocks A and B. Similarly, the pressurized feed exit ports of all of the membrane modules within each block are combined into an exit manifold for that block having a common exit port, such that the concentrate streams obtained from the exit ports of the membrane module in blocks A and B are united and fed into block C, and the concentrate stream obtained from the membrane modules in block C is discharged via discharge line 22. Thus each block has its own common entrance and exit ports, each of which may alternately serve as feed entrance and concentrate exit, respectively.

b) By appropriate switching of valves within a time period smaller than the shortest induction time, for a supersaturated salt at the conditions of the concentrate exiting stage (ii) at the end of step a), the original feed stream 28 is fed to the port of block C which served as exit port in step a) and to the original entrance port of block A which now serve as stage (i), as exemplified in FIG. 3B. The exit from stage (i) is then fed to the original exit port of block B from step a) and leaves through the original entrance port of block B from step a) which is discharged from the system via discharge line 22 after passing any back pressure valves or flow restrictors 23 which may be used to generate the needed pressure.

c) within a time interval smaller than the shortest induction time for a supersaturated salt at the conditions of the concentrate exiting stage (ii) at the end of step b), the original feed stream 28 is fed to the original exit port of block C from step a) and to the original entrance port of block B from step a) which now serve as stage (i), as exemplified in FIG. 3C. The new exit stream from stage (i) is now fed to the original exit port of block A from step a) which now serves as stage (ii). The concentrate exiting stage (ii) is now discharged from the original entrance port from step a) of block A to the concentrate stream and discharged from the system via discharge line 22 after passing any back pressure valves or flow restrictors 23 which may be used to generate the needed pressure.

d) By appropriate switching of valves within a time interval smaller than the shortest induction time for a supersaturated salt at the conditions of the concentrate exiting stage (ii) at the end of step c), the flow arrangements are returned to their status as described in step a) with blocks A and B serving as stage (i) and block C serving as stage (ii). This cyclical procedure is then repeated continually from steps a)-c).

Various ways for determining the induction time that should not be exceeded during the operation of each flow arrangement has been described in detail in international patent application No. PCT/IL04/001110, and will be briefly discussed hereinbelow.

The velocity of opening and closing the valves as described in table 2 can be controlled to minimize pressure waves (water hammer) which may occur during the switching of blocks between stages (i) and (ii).

A further embodiment of the invention is schematically illustrated in FIGS. 4A to 4F, in which an additional two-way bypass valve AV has been added in order to minimize any possible pressure wave effects that may develop due to sudden changes in the directions or velocities of the flows when switching the membrane module blocks between stage (i) and stage (ii). Bypass valve AV communicates between the valves $V_{2A}$, $V_{2B}$, and $V_{2C}$, and the discharge line 22, thereby providing a direct path between the discharge of the booster pump 20 (or—in the absence of the booster pump—between the stage (i) concentrate provided through line 29) and the concentrate line 22, thereby allowing partial or complete bypass of the blocks that are in stage (ii). The elements of the system shown in FIGS. 4A to 4F are substantially similar to those in the system shown in FIGS. 3A to 3C, and thus similar references are used in these figures to designate similar elements.

Various states of operation with the bypass valve AV are shown in FIGS. 4A to 4F which illustrates the transition between step a) and step b) as described herein before with reference to FIGS. 3A to 3C. As in FIG. 4, lines through which pressurized feed is flowing are shown in bold, valve ports that are open to flow are shown as black (filled) and valve ports that are shut to flow are shown in white (unfilled). The time interval of each of the substeps illustrated in the FIGS. 4A-4F is typically in the range of 2-120 sec. Table 4 summarizes the substeps for affecting the effecting rotation of blocks A-C during the transitions between steps a)→b), b)→c), and c)→a), using bypass valve AV. The transitions in the states of the different valves exemplified in FIGS. 4A-4F are summarized in substeps i-vi, respectively, of the transition between steps a) to b) in table 3.

The invention described above can be generalized to more than three blocks operating in two stages, so that there are three or more blocks in stage (i) and one block in stage (ii). For each additional block in stage (i), an additional two three-way valves should be added, and additional two two-way valves that are used in the same way as was previously described hereinabove. In this case four or more blocks can be rotated periodically from a position in stage (i) into the position corresponding to the module block in stage (ii). In a three-stage process this invention can be practiced on stages (ii) and (iii) in the way described above for stages (i) and (ii). Once the principle has been understood, one skilled in the art can apply this invention to more complex staged arrangements. It should be noted that this invention is applicable to processes where the product is the permeate stream (15) and also to processes in which the product is the concentrate stream (14).

The time required for a supersaturated aqueous solution to start precipitating sparingly soluble salts and/or minerals therefrom (in the absence of seed crystals or other appropriate pre-existing crystal growth surface) and/or organic substances to form a significant deposit is known as the "induction time".

Most preferably, the method according to the present invention comprises the estimation of the induction time associated with the composition of the water to be passed through the tapered flow arrangement and the nature of the membrane surface used therein, to permit the repositioning of the membrane modules and the essentially concurrent flow reversal to be carried out at the desired periodicity.

According to one preferred embodiment, the induction time is estimated experimentally, for example, by carrying out a preliminary experiment, in which the water stream corresponding to the final concentrate composition is passed along a small membrane unit under flow conditions generating the concentration polarization that would be expected in a full scale unit, without reversing the flow direction. The period of time measured until sparingly soluble salts from said water stream precipitate onto the membrane surface as reflected in a drop in membrane water permeability, or until a drop in the bulk concentration of the sparingly soluble salt is detected, is subsequently used to schedule the periodic repositioning of the membrane modules and the accompanying flow reversal. The occurrence of the precipitation of sparingly soluble salts onto the membrane surface may be conveniently tracked by measuring changes to the membrane water permeability, $L_p$, as measured by the flux divided by the net pressure driving force (NDP) as defined by:

$$L_p = \frac{J_V}{NDP} = \frac{J_V}{\Delta P - \Delta \pi} \quad (5)$$

Where $\Delta P$ and $\Delta \pi$ are the transmembrane pressure and the osmotic pressure difference between feed and permeate solutions respectively.

Alternatively, the induction time is estimated using the following equation:

$$\ln(\tau) = \frac{A}{[\ln(S)]^2} + B$$

wherein:

A and B are constants related to the salt, the hydrodynamics and the membrane surface, since the nucleation that must be prevented is the nucleation at the membrane surface. The constant A includes effect of the surface energy at the nucleating surface and molar volume of the salt. B includes the frequency factor for the nucleation rate. Values of A and B have already been determined, for example, for calcium sulfate and polyamide low pressure RO membranes (e.g., D. Hasson at al, "*Induction times induced in an RO system by antiscalants delaying CaSO4 precipitation*", Desalination, v.157 (2003), p 193; Alimi, F. et al, Desalination V 157, pp 9-16 (2003); He, S. et al, J. Colloid and Interface Science, V 162 pp. 297-303 (1994)). A and B may be also readily obtained experimentally as illustrated in WO 2005/053824.

S is the ratio between the maximum actual activity product of a given sparingly salt in the solution next to the feed side of the membrane and the thermodynamic solubility product, or, for an undissociated mineral (e.g. silica), it is the ratio of the actual maximum mineral concentration to the saturation concentration of that mineral for the given composition. It will increase with product water recovery and concentration polarization. This ratio can be calculated from commercial desalination process simulation programs available in the open market (such as IMS from Hydranautics, Inc or Rosa from Dow-Filmtec, Inc.), or independently as described in D. Hasson at al, "*Inception of CaSO4 scaling on RO membranes at various water recovery levels*", Desalination, 139, 73-81 (2001). S may be also calculated upon measuring data related to the concentration level of salts/mineral in the water stream, and data related to the permeate and concentrate flows. This data can be obtained utilizing appropriately placed flow meters and sensing devices within the system, in order to provide corresponding signals (e.g., conductivity) for calculating S. Typically, induction times are above 10 minutes.

Having obtained and or experimentally determined the values of A, B and S, for the relevant salt and system, one may easily estimate the induction time, T. The periodic repositioning and the accompanying flow reversal will then be set to take place at some time less than the induction time $\tau$, for example at 0.1 to 0.9 the value of the induction time. In the event that there is more than one sparingly soluble salt, the salt with the shortest induction time will be the one used for determining the period for the repositioning of the membrane modules and the accompanying flow reversal.

Alternatively, the induction time may be determined during system operation via appropriately situated sensors for monitoring permeation rate (flow meter or weigh scale) or scaling ion concentration (e.g. using calcium sensor, or conductivity sensor) as a function of time, to see when these indicators change as a result of precipitation in the system.

Specific procedures for estimating induction times are described in detail WO 2005/053824, which is incorporated herein by reference.

Onset of biofouling or organic fouling may be determined with a test coupon of flat sheet membrane (e.g. 2 cm by 8 cm active area) run in a flat membrane flow cell, on the same feed and with the same linear tangential velocity and flux as will be found in the entrance of the tapered cascade where potential for biofouling is the greatest. The formation of a biofilm can be monitored by in-situ sensors documented in the literature (see following references) to determine both onset of deposit formation and changes of deposit structure with time. In the case of the ultrasonic sensors (see references by Greenberg A. R. et al.), these can even be applied to actual module housings.

More specifically, organic and biofouling can be monitored by in-situ sensors documented in the literature (For example, Nivens, D. E., Journal of Industrial Microbiology, V. 15 (1995), pp 263-276; Chen, V., Li, H., Fane, A. G. *Journal of Membrane Science* 241 (1), pp. 23-44; Greenberg, A. R., Krantz, W. B. (2003) Fluid—Particle Separation Journal, 15 (1), pp. 43-49; Li, J., Sanderson, R. D., Chai, G. Y., Hallbauer, D. K. (2005) *Journal of Colloid and Interface Science,* 284 (1), pp. 228-238; Li, J., Hallbauer, D. K., Sanderson, R. D. Journal of Membrane Science 215 (1-2), pp. 33-52 ) in order to determine both onset of deposit formation and changes of deposit structure with time. In the case of the ultrasonic sensors (see references by Greenberg A. R. et al.), these can even be applied to actual module housings.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for operating a tapered flow pressure driven arrangement containing a plurality of membrane modules, which comprises positioning said membrane modules in at least two successively arranged flow stages, such that the number of membrane modules operating in parallel in a given flow stage is greater than their number in the consecutive flow stage, passing a feed stream through a flow stage to generate a permeate and a concentrate, directing said concentrate to the consecutive flow stage and passing said concentrate therethrough, while periodically replacing one or more of the membrane modules belonging to said consecutive flow stage with one or more membrane modules belonging to the previous flow stage, wherein the periodicity of said replacement is such that the surface of membranes disposed in said consecutive flow stage is exposed to super-saturation conditions associated with the passage of said concentrate for a period of time that is shorter than the time required for said concentrate to precipitate therefrom one or more sparingly soluble salts and/or minerals, onto the surface of the membranes in said consecutive flow stage under said super-saturation conditions, or before deposit of organic substances can occur in the first of said two or more successively arranged flow stages.

2. The method according to claim 1, further comprising concurrently with the repositioning of membrane modules in the sequentially arranged flow stages, reversing the flow direction within at least a portion of the newly positioned membrane modules.

3. A method according to claim 1, wherein the time during which the surface of membranes disposed in the consecutive flow stage is exposed to super-saturation conditions is less than the induction time $\tau$, which is the time required for the supersaturated stream to precipitate one or more of the sparingly soluble salts and/or minerals therefrom, wherein said induction time is predetermined experimentally, or estimated separately for each of said sparingly soluble salts and/or minerals present in the water stream using the following equation:

$$\ln(\tau) = \frac{A}{[\ln(S)]^2} + B$$

wherein:
A and B are constants related to a given sparingly soluble salt or mineral and the membrane used;
and S is the ratio between the maximum actual activity product of a given sparingly soluble salt or mineral in the solution next to the high pressure side of the membrane and the thermodynamic solubility product.

4. A method according to claim 1, wherein the time during which the surface of membranes disposed in the consecutive flow stage is exposed to super-saturation conditions is determined by means of one or more appropriately situated sensors capable of indicating deposit formation in at least one of said membranes.

\* \* \* \* \*